United States Patent [19]

Kozempel et al.

[11] Patent Number: 4,900,568
[45] Date of Patent: Feb. 13, 1990

[54] PROCESS AND APPARATUS FOR EXTRUSION UTILIZING FORCE MEASUREMENT MEANS

[75] Inventors: Michael F. Kozempel, Hatfield; Wolfgang K. Heiland, Trevose, both of Pa.

[73] Assignee: The United States of America as represented by the Secretary of Agriculture, Washington, D.C.

[21] Appl. No.: 240,304

[22] Filed: Sep. 6, 1988

[51] Int. Cl.⁴ .................. A23P 1/12; G01N 33/02
[52] U.S. Cl. .................. 426/231; 264/40.7; 425/135; 425/149; 426/233
[58] Field of Search .................. 426/231, 233, 523; 425/149, 135; 264/40.5, 40.7

[56] References Cited

U.S. PATENT DOCUMENTS 3,357,049  12/1967  Spindler .................. 425/149
3,841,812  10/1974  Wright .................. 425/149

Primary Examiner—George Yeung
Attorney, Agent, or Firm—David R. Sadowski; M. Howard Silverstein

[57] ABSTRACT

Disclosed are processes and apparatus utilizing, choke means at least partially providing restriction to passage of material and measurement of magnitude of force(s) exerted on said choke means by passage of material, to provide: (1) an indication of characteristics of the material, and/or; (2) control of said passage of material and/or control or processes or apparatus associated with said passage of material in response to the magnitude of the measured force(s).

31 Claims, 4 Drawing Sheets

PROCESS AND APPARATUS FOR EXTRUSION UTILIZING FORCE MEASUREMENT MEANS

BACKGROUND OF THE INVENTION

1. Field of the Invention

The present invention is drawn to novel and inventive apparatus and processes employing, choke means at least partially providing restriction to passage of material, and measurement of magnitude of force(s) exerted on said choke means by passage of material, in order to provide: a characterization of the material; and/or control of the passage of material and/or control of processes or apparatus associated with the passage of material, in response to the magnitude of the measured force(s).

2. Description of the Prior Art

In regard to characterization of extrudeable material, one prior art device for evaluating texture or degree of cooking is a "Texturepress" sold by the Food Texture Corporation (Rockville, Md.). With this prior art device, texture is evaluated by measuring the force required to back extrude material in a back extrusion cup with a fixed annular gap. The prior art device suffers from the disadvantages of: (1) requiring that a sample must be manually removed from the processing line (i.e. the prior art device is not automatic or in-line); (2) possible requiring sample preparation (e.g. processing or conditioning) prior to evaluation; (3) the prior art device utilizes batch rather than continuous operation; (4) the force measurement must be interpreted; (5) such manual sample manipulation and interpretation, increase the probability of errors; (6) only subsequent to said interpretation may adjustments in the processing line parameters be made, thus necessitating a time delay between when the sample is taken and when the adjustments may be made.

In regard to evaluation of degree of cooking, the only prior art test for degree of cooking of potatoes in preparation for production of potato flakes known to the present inventors involves placing cooked mashed potatoes on a sieve and running hot water over the potatoes and through the sieve. Allegedly the number and size of the potatoe pieces remaining on the sieve reflects the degree to which the potatoes are cooked. For French fried potatoes, a prior art test for degree of cooking involves taking a sample of cooked french fries, and measuring the degree to which they deflect under a known force. Presumably the degree of deflection is an indication of the degree to which they are cooked. Clearly such tests are not in-line, not continuous, not automatic, require manual labor, do not operate in real-time with the cooking, may require sample preparation, and are apparently inaccurate.

Another prior art device is disclosed in U.S. Pat. No. 3,470,584 issued 10/7/69 to Iwata et al which includes: a restriction formed between a valve and an outlet of a feed apparatus, and distance indicating means for indicating the clearance distance between said valve and said outlet of said feed apparatus. However, said distance indicating means is not taught by Iwata et al to be useful for (nor will said means function for) measuring the magnitude of force applied to the valve by passage of material through the restriction. The distance indicating means of Iwata et al is precluded from functioning to indicate the magnitude of force applied to the valve by passage of material through said restriction, at least by the presence of varying forces on the valve other than the force applied by passage of material through said restriction e.g. varying reduced pressure in the reduced pressure chamber, lodging of lumps in the clearance between the outlet and the valve, varying pressures applied to each side of the piston 26. The device of Iwata et al also differs greatly from the present invention in other important respects.

SUMMARY OF THE INVENTION

It is an object of the present invention to avoid the aforementioned disadvantages of the prior art, by providing continuous, in-line, automatic, safe, real-time operation, and avoiding the manual labor, sample preparation, time delay and possibility of errors, which occur with the evaluation procedures of the prior art.

Another object of the present invention is to provide highly advantageous and accurate, evaluation (e.g. with recording and/or control) of the characteristics of a material.

It is another object of the invention to integrate said highly advantageous and accurate evaluation into manufacturing (e.g. continually operated manufacturing), in order to control the manufacturing in response to said evaluation, and consequently provide desired or optimum manufacturing conditions (e.g. optimized in regard to economics or productivity) and to provide a product of consistently high quality.

Another object of the present invention is insuring safe and proper operation by, providing detection of improper or unsafe conditions, and providing means to operate a fail-safe shut-off and/or alarm.

These and other objects of the present invention, which will become readily apparent from the ensueing description, are accomplished by utilization of:

a housing, choke means cooperating with said housing to provide restriction to passage of material from said housing, conveying of material (or utilization of means for conveying of material) through at least a portion of said housing and to said choke means, and measuring of magnitude of force(s) (or utilization of means for measuring magnitude of force) applied to said choke means by passage of material through said restriction (e.g. through or along said choke means); inorder to (a) provide an indication of characteristics of the material, and/or (b) control the passage of material and/or control of processes or apparatus associated with said passage of material, in response to the magnitude of the measured force(s).

DESCRIPTION OF THE PREFERRED EMBODIMENTS

Figure 1:
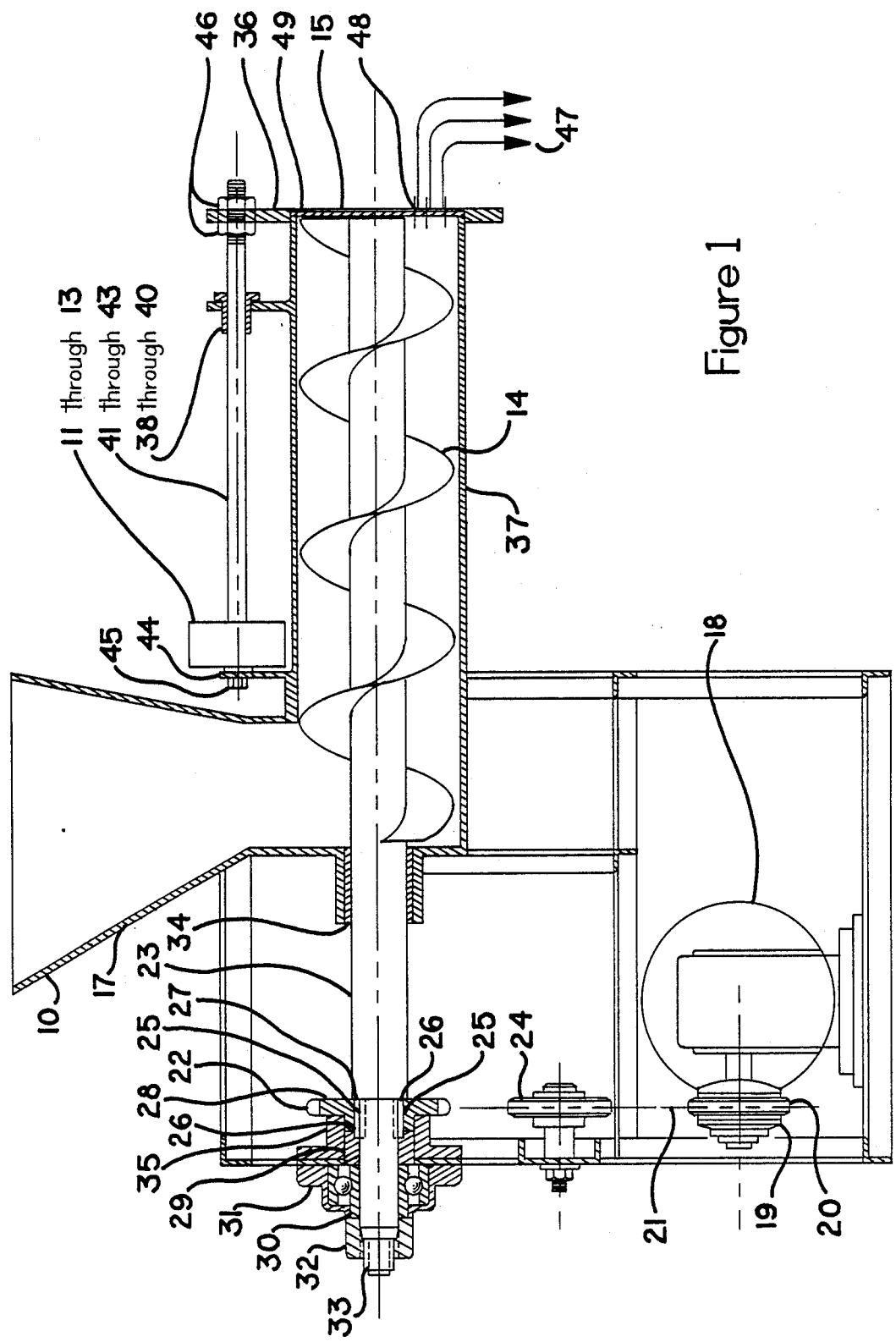
FIG. 1 is a side view of a first embodiment of an apparatus of the present invention with a die extrusion plate in place, cut away along line 1—1 of FIG. 2.

FIG. 1 depicts a first embodiment of a device of the present invention, which utilizes a housing 17 including an inlet hopper 10 and a cylindrical barrel portion 37. Disposed within the barrel portion 37 is a cantilevered helical screw 14 (i.e. conveying means) integral with a shaft 23. During operation, material to be extruded is inserted into inlet hopper 10 and is conveyed by helical screw 14 through barrel portion 37 to a choke means (i.e. means providing a restriction or constriction to passage or flow). Said choke means may for example comprise: (1) a die extrusion plate 15 (as shown in FIG. 1 and the right side of FIG. 2 which defines one or more apertures (e.g. ninety-six 4 millimeter diameter circular apertures) designated 48 (such a perforated extrusion plate may be utilized when it is desired that the material to be extruded should be comminuted, riced and/or segmented); (2) an imperforate extrusion plate 16 (as shown in FIG. 3 and the left side of FIG. 2) which is spaced from the end of barrel 37 (e.g. 4 mm) so as to define an annular slot 50 of substantially uniform width. The use of an imperforate plate has advantages over use of a perforated plate, in that the imperforate plate is easier (and therefore less expensive) to manufacture and is easier to clean; (3) a conically (e.g. right circular cone) shaped plate, which defines an apex portion of relatively small cross-section and a base portion of relatively large cross-section, and at least the apex portion of said conically shaped plate is positioned within the end of housing barrel portion 37; (4) a plate which is a grid e.g. defining a plurality of elongated slots or rectangular aperatures; etc. It should be understood that the present invention may employ: (1) a housing of any shape or configuration; (2) any conveying means for conveying material to be extruded, e.g. a conveyor, pump, etc.; (3) a choke means of any convenient shape or configuration; (4) any type of extrudeable material, including gels, semi-solids, extrudeable solids such as soft or finely divided solids, slurries, thixotropic materials, food, cooked foods e.g. potatoes, etc. FIG. 1 depicts an example of a drive train which may be used to turn helical screw 14 including: an electrical DC (direct current) variable speed gear head motor 18, a torque limiter 19 and plate sprocket 20 connected by a chain 21, to a second sprocket 22 which is mounted on shaft 23 of screw 14. Torque limiter 19 functions to prevent overloading of the motor 18 by permitting chain slippage if an undesirably high load occurs. Proper chain tension is maintained by use of an adjustable idler sprocket 24. Sprocket 22 defines two key ways designated 25, which match two keys 26, each of which is bolted to shaft 23, thus insuring that rotation of the sprocket 22 will rotate shaft 23. Axial restraint of sprocket 22 is accomplished by means of: shoulder 27 on shaft 23, hub 28 of sprocket 22, spacer 29, inner race 30 of ball bearing 31, and knurled nut 32 which is threaded onto threaded portion of 33 of shaft 23.

Screw 14 with integral shaft 23 is supported by two bearings i.e. sleeve bearing 34 of housing 17, and ball bearing 31 which also bears forces exerted axially on shaft 23. Also an auxiliary bearing 35 may be provided, which bearing fits loosely around the other circumference of hub 28 of sprocket 22. Auxiliary bearing 35 keeps sprocket 22 in place when screw 14 is removed from the housing for cleaning purposes (i.e. after removal of knurled nut 32). The aforementioned bearing configuration, providing a cantilevered support of the screw 14, is especially advantageous in: (1) facilitating the assembly and/or disassembly of the device to permit cleaning, maintenance and/or repair; (2) facilitating accurate measurement of the force exerted by the material being conveyed, on the plate 15 or 16.

Figure 2:
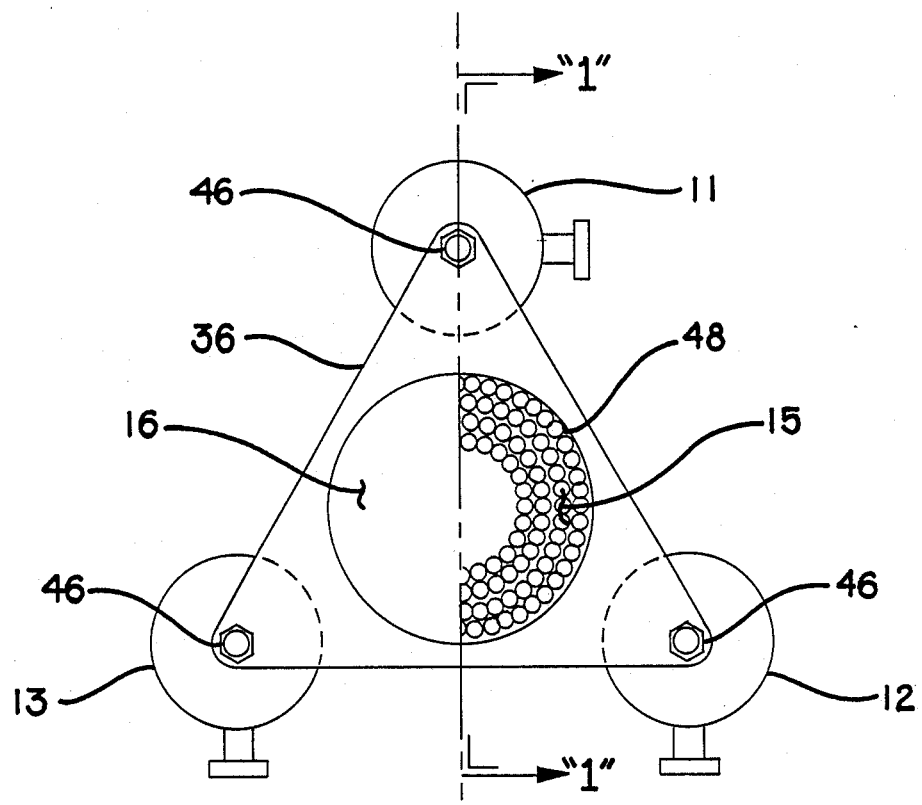
FIG. 2 is a view of the discharge end of an apparatus of the present invention, showing two different extrusion plates i.e. the right half of FIG. 2 shows a die extrusion plate (e.g. for ricing) and the left half of FIG. 2 shows an imperforate extrusion plate for radial extrusion.
Figure 3:
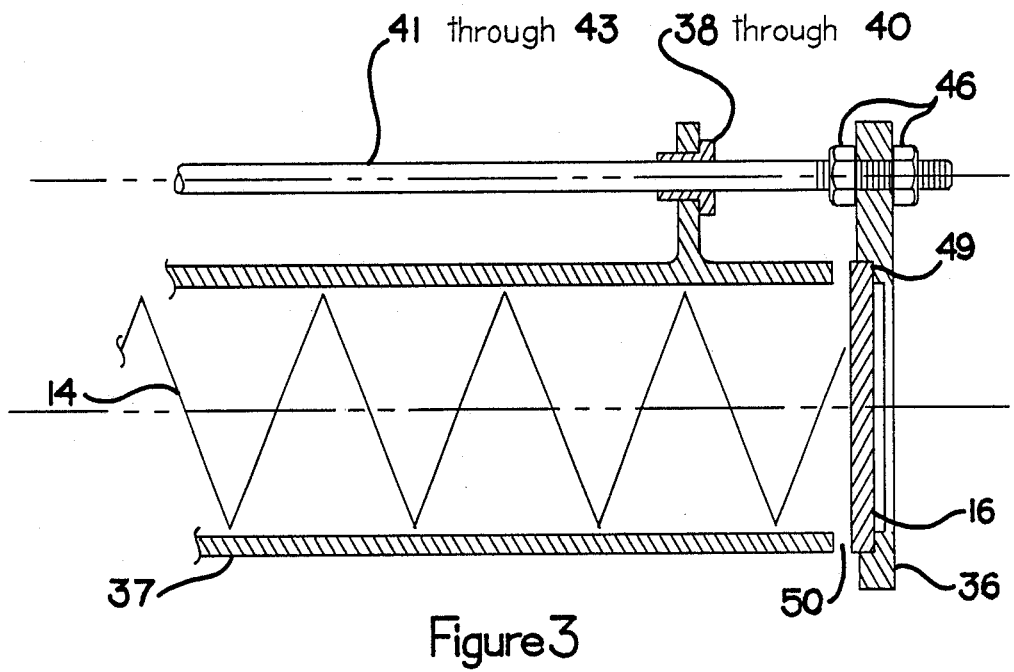
FIG. 3 is a partial side view of the discharge end of an apparatus of the present invention employing an imperforate extrusion plate.

Viewing FIG. 1 together with FIGS. 2 and 3, it may be observed that the device of the present invention may be provided with three force measurement means designated 11, 12 and 13 (although in order to simplify the illustrations, FIGS. 1 and 3 show only one such force measurement means and its accompanying connections). Said force measurement means may for example include a load cell e.g. of the type utilizing strain gauges in a flexurally stiff electromechanical device where the strain gauges are electronically connected to form a four arm Wheatstone bridge measurement circuit. When such a circuit is provided with an excitation voltage the load cells 11, 12 and 13 yield an electrical output signal which is proportional to, and inherently linear to, the magnitude of the applied load(s) or force(s). Alternatively, the force measurement means may take the form of hydraulic or pneumatic force measurement devices, or spring scales (i.e. where measurement of degree of spring compression or expansion is representative of the magitude of applied force), piezoelectric crystal utilizing force measurement means, etc. Although FIG. 2 shows three such force measurement means spaced equally (i.e. at 120° intervals) around the circumference of barrel 37, the device may be provided with any number of force measurement means, i.e. one or more. Said load measurement means function to measure the force, exerted by the material being conveyed, on the plate 15 or 16. This measurement of force may be utilized to: (1) provide a characterization of the material e.g. to provide a characterization of, the texture of a material, or the degree to which a food is cooked; and/or (2) provide a fail safe control, so that when the measured force reaches or approaches an undesirably high force e.g. a predetermined maximum force, the control means may automatically turn off the device, as for example by turning off power to the motor 18. FIGS. 1, 2 and 3 show connection of a first end of each of the force measurement means 11, 12 and 13 to a first end of tension rods 41, 42 and 43 respectively, the second end of each force measurement means being rigidly attached to a flange 44 (on housing 17) by bolts 45. In order to insure proper positioning of the tension rods, and of apparatus elements connected to the tension rods, each tension rod may be loosely supported by a guide bushing designated 38, 39 and 40. The guide bushings loosely support the tension rods so that the tension rods may slide with respect to the guide bushings, so that the guide bushings do not interfere with conducting of force to the force measurement means. The second end of each of the tension rods is threaded, and is held by two nuts 46 to an end plate 36, which holds plate 15 or 16 in a circular shoulder 49 (plate 15 or 16 being approximately centered in end plate 36). By use of one nut 46 on each side of the end plate 36 for each tension rod: (1) the position of the end plate assembly with respct to the housing barrel portion 37 may be adjusted; and (2) interaction between the force measurement means and the end plate assembly may be adjusted e.g. so that each force measurement means may be "preloaded" ("preloaded" refers to the force exerted on the pressure measurement means, through the tension rod, by adjusting of bolts 45 and 46 to force end plate 36 and plate 15 against the end of housing barrel portion 37, prior to conveying of material against plate 15 i.e. "pre" referring to before operation of the device).

In operation of the device of the present invention utilizing the perforated die plate 15 shown in FIG. 1 and the right portion of FIG. 2, material is fed into inlet hopper 10 and is conveyed by the rotating helical screw 14 (driven by the drive train) to and through plate 15. The helical screw 14 provides sufficient force to extrude the material 47 through a plurality of small apertures 48 defined by die plate 15. Similarly, in operation of the device of the present invention utilizing the imperforate plate 16 shown in FIG. 3 and the left side of FIG. 2, material is fed into inlet hopper 10 and is conveyed by the rotating helical screw 14 (driven by the drive train) to imperforate plate 16. The imperforate plate 16 is: (1) spaced from, (2) approximately concentric with, and (3) has an outer diameter approximately the same size as the outer diameter of, the end of housing barrel portion 37; and thereby an annular slot 50 of substantially uniform width is defined between plate 16 and the end of housing barrel portion 37. Consequently, the material is forced to move radially and extrude through the annular slot 50. The force exerted on either plate 15 or 16 is directed through shoulder 49, end plate 36, nuts 46, and tension rods 41, 42 and 43, and is thereby transmitted to the force measurement means 11, 12 and 13. Its is apparent from the foregoing description of the directing and transmitting of the force through the various apparatus components, that said components will not move or distort during normal use to such an extent as to permit substantial movement of either plate 15 or 16 with respect to the housing (e.g. housing barrel portion 37), and thereby provided means for substantially preventing movement of the plate 15 or 16 with respect to the housing (i.e. precluding that structure taught by the aforementioned Iwata et al patent which includes both means to move the valve and means to permit movement of the valve). It should also be noted in regard to the aforementioned Iwata et al patent, and the deformable-flexible valve 121 shown in FIG. 4 thereof: that the plates 15 and 16 of the present invention are constructed so as not to substantially distort or flex or bend or deform during normal use. The force measured by the force measurement means, is a measure of the resistance of the material to extrusion (e.g. either through die extrusion plate 15 or radially past imperforate extrusion plate 16), and therefore is a measure of characteristics of the material e.g. a measure of viscosity, texture, homogeneity (e.g. by variation, or lack of variation, in the measured force), degree to which a food has been cooked, etc..

Figure 4:
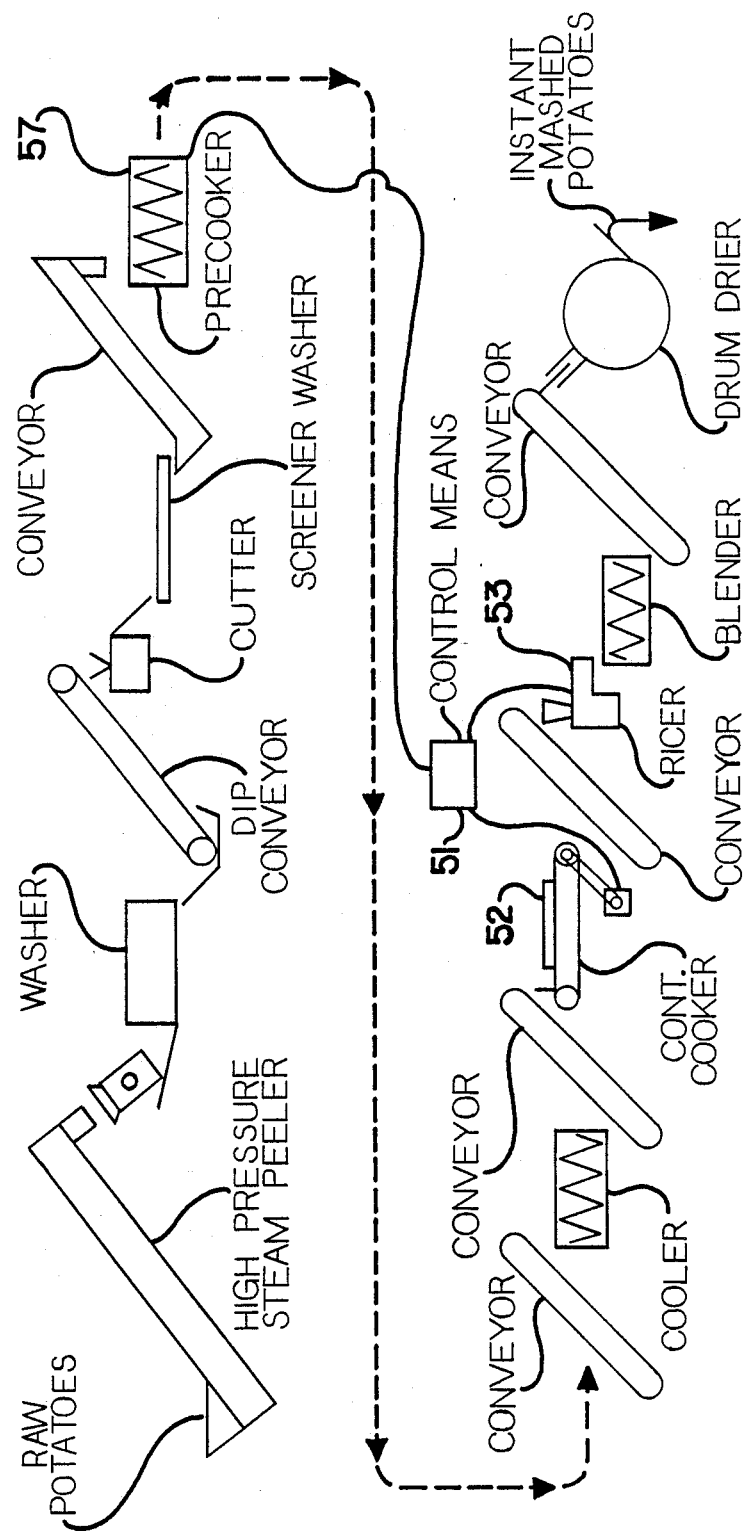
FIG. 4 is a schematic showing use of a ricer of the present invention in a continuous instant mashed potato production apparatus.

FIG. 4 illustrates an apparatus for production of mashed potatoes, which utilizes conventional apparatus components, with the exception of: (1) control means 51, and; (2) a ricer 53 of the present invention (i.e. an apparatus as illustrated in FIG. 1 employing a die extrusion plate 15) which not only functions to rice the potatoes, but also functions to detect the degree to which the potatoes are cooked, by virtue of having the electrical output from its force measurement means 11, 12 and 13 conducted to a control means (e.g. miniprocessor) 51. The ricer 53 may be relatively large and utilized instead of a conventional ricer (i.e. so that all of the potatoes are riced by ricer 53) or, the ricer 53 may be relatively small and connected in parallel to the conventional ricer (i.e. so that a portion of the potatoes are riced by each of the ricer 53 and the conventional ricer). The control means 51, controls the degree to which continuous cooker 52 cooks the potatoes, and/or controls the degree to which continuous precooker 57 cooks the potatoes (e.g. to provide a desired degree of cooking, or to provide an optimum degree of cooking). The ricer 53 and control means 51 provide highly advantageous, in-line, continuous and automatic detection and control of degree of cooking. The control means may control the cooking either by: (1) adjusting the temperature in the cooker and/or precooker i.e. if the force measurement means of ricer 53 detect a relatively large force indicative of under cooking then the temperature is increased, and conversely if the force measurement means of ricer 53 detect a relatively small force indicative of over cooking then the temperature is decreased, and/or; (2) if the cooker and/or precooker are of the type employing a conveyor (e.g. belt, screw, etc.), by adjusting the speed of the conveyor e.g. the conveyor speed is slowed if undercooking is detected by ricer 53 (i.e. by detection of a relatively large force by the force measurement means) or, the conveyor speed is increased if overcooking is detected by ricer 53 (i.e. by detection of a relatively small force by the force measurement means). The ricer and control means thus provide both: accurate, continuous, in-line and automatic detection, and; control of the degree of cooking. The control means may also function to provide an alarm and/or "fail safe" shut off of the apparatus (e.g. cooker and motor) when the force detected by the ricer 53 approaches an unacceptably high level i.e. a force level which might damage the ricer, as for example by causing a failure of, the housing, helical screw, drive train, plates or plate support assembly, etc.. Alternatively or additively, to the control means 51, means for recording and/or displaying (e.g. to permit monitoring of) the output of the force measurement means may be provided, in order to record and/or permit monitoring of the forces during operation of the apparatus.

Figure 5:
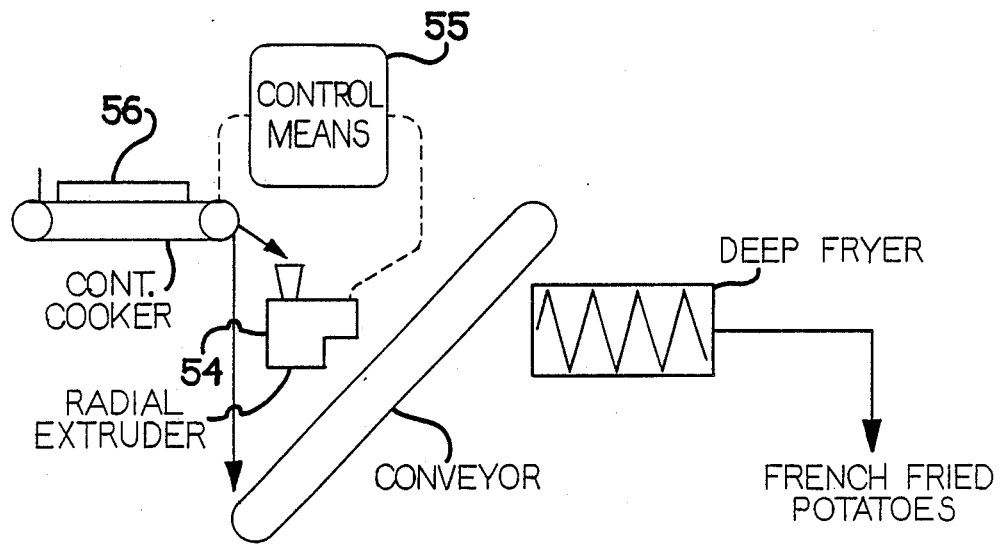
FIG. 5 is a schematic showing use of a radial extruder of the present invention in a continuous French fried potato production apparatus.

FIG. 5 illustrates an apparatus for production of French fried potatoes, which utilizes conventional apparatus components with the exception of: (1) the control means 55, and; the radial extruder 54 of the present invention (i.e. an apparatus as illustrated in figure 1 employing an imperforate extrusion plate 16) which has the electrical output from its force measurement means 11, 12 and 13 conducted to the control means 55. The control means 55 controls the degree to which continuous cooker 56 cooks the potatoes. The radial extruder 54 receives a portion of the potatoes from the continuous cooker 56 for testing, while the remainder of the potatoes are directed to the conveyor. The control means 55 may function to provide, cooking control and optionally fail safe shut-off and/or an alarm, as described herein above in regard to control means 51. The radial extruder and control means thus provide both: accurate, continuous, in-line and automatic detection, and; control of the degree of cooking. Alternatively or additively, to the control means 55, means for displaying (e.g. to permit monitoring) and/or recording of the electrical output of the force measurement means may be provided, inorder to permit monitoring and/or recording of the forces measured during operation of the apparatus.

The details of the control means 51 and 55 are not disclosed herein, because one of ordinary skill after having read the instant disclosure and description of connection and operation of the control means, could construct such a control means.

COMPARATIVE EXAMPLE

The following example is intended only to further illustrate the invention and is not intended to limit the scope of the invention which is defined by the claims.

A comparative test was conducted in order to compare, the ability for measuring texture or degree of cooking of a device constructed in accordance with the present invention, with such ability of a prior art device (i.e. a Food Texture Corp. (FTC), Rockville, Md., testing machine model TP2 with a model FTA-300 force transducer) which has been proven to be capable of measuring texture or degree of cooking. Said prior art device is not in-line nor is its operation continuous or automatic. The model TP2 machine utilized a cylinder having a 53.2 millimeter inner diameter and 76.2 millimeter depth, which has a 45.2 millimeter diameter piston centered therein, so as to define a 4 millimeter wide annular clearance between the cylinder and the piston. The stroke depth of the piston was 65.1 mm thus providing an 11.1 millimeter bottom clearance. Cooked potato samples were evaluated in the TP2 device by placing a sample into the cup and measuring the peak force required to move the piston in the cylinder (at a constant rate of 6.8 mm/second) and thus force the sample through the annular space between the cylinder and the piston. A device was constructed in accordance with the present invention i.e. of the type shown in instant FIGS. 1 and the right side of FIG. 2, having a die extrusion plate 15 defining a plurality of apertures, so as to provide ricing of the potato. Said device employed a helical screw, having a 5 inch diameter, 3½ inch pitch and 17 inch length (including 5 inches under the feed hopper), and a solid core of 1⅜ inch diameter. Said screw was rotated at 40 rpm in a barrel-shaped housing of 5 inch inner diameter and 12 inch length. Six potato samples (samples numbered 1-6), were each subjected to pre-cooking in a pre-cooker for 10 minutes at approximately 185° F. and then subsequently cooked in a steam cooker at about 212° F. for six different time periods specified in table 1 below. Each of the six samples was then divided, and the force required to extrude a portion of each of the samples was measured in each of the model TP2 device and the device constructed in accordance with the present invention. The results were as follows:

TABLE 1

| Sample No. | Steam Cooking Time In Minutes (min) & Seconds (sec) | Force for FTC Device (lbs. force) | Force for Present Invention (lbs. force) |
| --- | --- | --- | --- |
| 1 | 11 min. 40 sec. | 45 | 52 |
| 2 | 10 min. 25 sec. | 55 | 62 |
| 3 | 8 min. 20 sec. | 63 | 68 |
| 4 | 7 min. 45 sec. | 76 | 80 |
| 5 | 6 min. 0 sec. | 91 | 99 |
| 6 | 4 min. 25 sec. | 102 | 107 |

Figure 6:
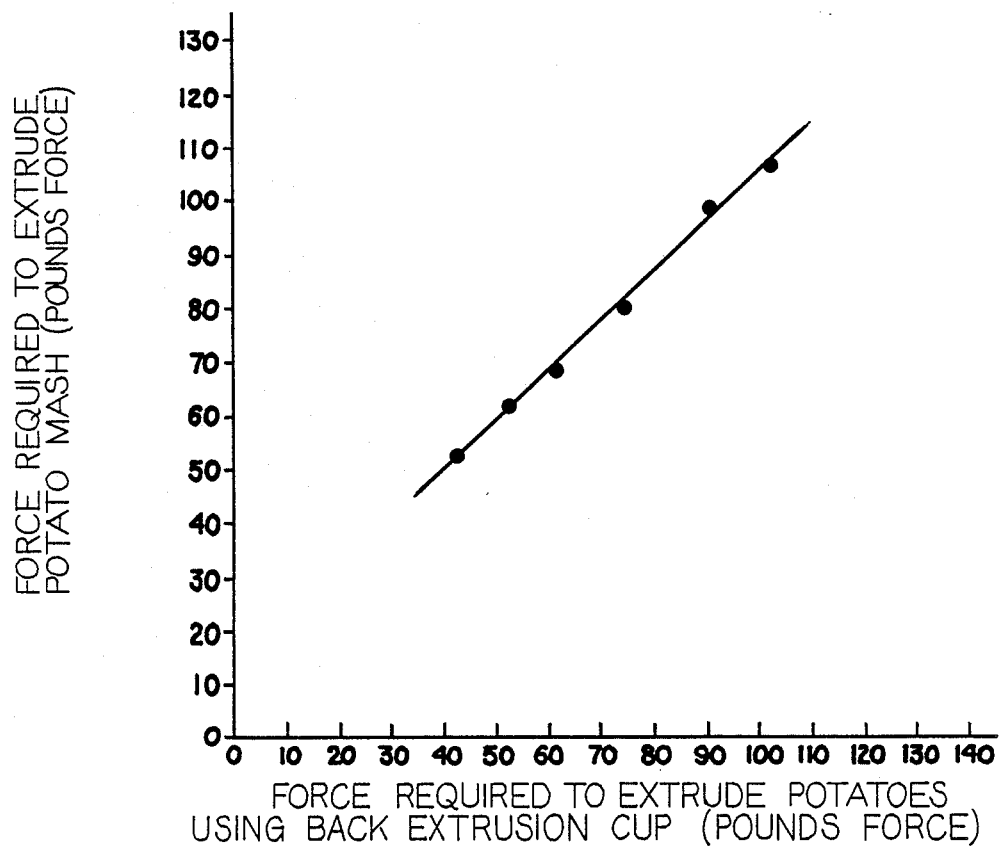
FIG. 6 is a graph of forces measured with a ricer of the present invention versus forces measured with a prior art back extrusion cup, showing the close correlation between those two measurements.

These results are graphed in FIG. 6, with the force required to extrude the potatoes samples with the FTC device represented on the abscissa (i.e. x-axis) labelled "Force required to extrude potatoes using back extrusion cup" and the force required to extrude the potato samples with the above described device constructed in accordance with the present invention represented on the ordinate (i.e. y-axis) and labelled "Force required to extrude potato mash". It is clear from the results set forth in table 1 and shown in FIG. 6 that there is a close correlation (i.e. linear relationship) between results obtained with a device constructed in accordance with the present invention and results obtained with the prior art TP2 device, thus providing clear evidence that a device constructed in accordance with the present invention does accurately measure: (1) the resistance to extrusion; (2) texture and; (3) degree of cooking; of a material.

The foregoing detailed descriptions and example are given merely for purposes of illustration. Modifications and variations may be made therein without departing from the spirit and scope of the invention.

| INDEX OF APPARATUS ELEMENTS DESIGNATED BY A NUMERAL | |
| --- | --- |
| 10 inlet hopper | 34 sleeve bearing |
| 11 force measurement means | 35 auxiliary bearing |
| 12 force measurement means | 36 end plate |
| 13 force measurement means | 37 housing barrel portion |
| 14 helical screw | 38 guide bushing |
| 15 die extrusion plate | 39 guide bushing |
| 16 imperforate extrusion plate | 40 guide bushing |
| 17 housing | 41 tension rod |
| 18 variable speed gear head motor | 42 tension rod |
| 19 torque limiter | 43 tension rod |
| 20 plate sprocket | 44 flange |
| 21 chain | 45 bolts |
| 22 sprocket | 46 nuts |
| 23 shaft | 47 extruded material |
| 24 idler sprocket | 48 apertures |
| 25 key ways | 49 shoulder |
| 26 key | 50 annular slot |
| 27 shoulder | 51 control means |
| 28 hub | 52 continuous cooker |
| 29 spacer | 53 ricer |
| 30 inner race | 54 radial extruder |
| 31 ball bearing | 55 control means |
| 32 knurled nut | 56 continuous cooker |
| 33 threaded portion of shaft | 57 precooker |

We claim:

1. An apparatus comprising,
   a housing,
   choke means cooperating with said housing to provide restriction to passage of material from said housing,
   conveying means for conveying material through at least a portion of said housing and to said choke means, and
   force measurement means operatively connected to said choke means for measuring the magnitude of force applied to said choke means by passage of material through said restriction.

2. The apparatus of claim 1 wherein said choke means comprises a plate defining at least one aperture therein.

3. The apparatus of claim 2 wherein said plate defines at least one circular aperture.

4. The apparatus of claim 2 wherein said plate defines at least one rectangular aperture.

5. The apparatus of claim 1 wherein said choke means comprises an imperforate plate which is spaced from an end of said housing.

6. The apparatus of either claim 2, 3, 4 or 5 wherein said plate is circular and said housing includes a cylindrical portion.

7. The apparatus of claim 1 wherein,
said choke means comprises a plate which is conical and therefore defines an apex portion of relatively small cross-section and a base portion of relatively large cross-section, and
at least the apex portion of said plate is positioned within said housing.

8. The apparatus of claim 1 further comprising fail safe control means connected to both said force measurement means and said conveying means, for stopping operation of said conveying means in response to measurement of an undesirably high force by said force measurement means.

9. The apparatus of claim 1 further including control means, connected to both cooking means for providing a controllable degree of cooking and said force measurement means, for controlling the degree of cooking provided by said cooking means in response to force measured by said force measurement means.

10. The apparatus of claim 1 wherein said conveying means includes,
a helical screw disposed within said housing, and
means operatively associated with said helical screw for rotating said helical screw.

11. The apparatus of claim 1 wherein said force measurement means includes at least one load cell.

12. The apparatus of claim 11 wherein each said at least one load cell is connected by a tension rod to said choke means.

13. The apparatus of claim 1 further including means operatively associated with said force measurement means for recording force measured by said force measurement means.

14. The apparatus of claim 1 further including means operatively associated with said force measurement means for displaying force measured by said force measurement means.

15. The apparatus of claim 1 further including means for substantially preventing movement of said choke means with respect to said housing.

16. A process comprising,
providing a housing,
providing choke means cooperating with said housing to provide restriction to passage of material from said housing,
conveying material through at least a portion of said housing and to said choke means, and
measuring the magnitude of force applied to said choke means by passage of material through said restriction.

17. The process of claim 16 wherein said choke means comprises a plate defining at least one aperture therein.

18. The process of claim 17 wherein said plate defines at least one circular aperture.

19. The process of claim 17 wherein said plate defines at least one rectangular aperture.

20. The process of claim 16 wherein said choke means comprises an imperforate plate which is spaced from an end of said housing.

21. The process of either claim 17, 18, 19 or 20 wherein said plate is circular and said housing includes a cylindrical portion.

22. The process of claim 16 wherein,
said choke means comprises a plate which is conical and therefore defines an apex portion of relatively small cross-section and a base portion of relatively large cross-section, and
at least the apex portion of said plate is positioned within said housing.

23. The process of claim 16 further including stopping said conveying when said measuring force detects an undesirably high force.

24. The process of claim 16 further including, providing cooking means for providing a controllable degree of cooking, and controlling the degree of cooking provided by said cooking means in response to force measured by said measuring.

25. The process of claim 16 wherein said conveying material includes rotating a helical screw disposed within said housing.

26. The process of claim 16 wherein said measuring of force includes use of at least one load cell for measuring force.

27. The process of claim 26 wherein each said at least one load cell is connected by a tension rod to said choke means.

28. The process of claim 16 further including recording force measured by said measuring of force.

29. The process of claim 16 further including displaying force measured by said measuring of force.

30. The process of claim 16 wherein said choke means does not substantially move with respect to said housing during said conveying.

31. The process of claim 16 wherein said material is potatoes.

* * * * *